US011880876B2

(12) United States Patent
Mann et al.

(10) Patent No.: US 11,880,876 B2
(45) Date of Patent: Jan. 23, 2024

(54) PLATFORMS INTEGRATION SYSTEM

(71) Applicants: Landon E. Mann, West Jordan, UT (US); Ashley C. Wilhelm, West Jordan, UT (US)

(72) Inventors: Landon E. Mann, West Jordan, UT (US); Ashley C. Wilhelm, West Jordan, UT (US)

(*) Notice: Subject to any disclaimer, the term of this patent is extended or adjusted under 35 U.S.C. 154(b) by 324 days.

(21) Appl. No.: 17/464,238

(22) Filed: Sep. 1, 2021

(65) Prior Publication Data

US 2023/0031675 A1 Feb. 2, 2023

Related U.S. Application Data

(60) Provisional application No. 63/227,716, filed on Jul. 30, 2021.

(51) Int. Cl.
*G06F 3/0482* (2013.01)
*G06Q 30/0601* (2023.01)
*G06F 9/451* (2018.01)

(52) U.S. Cl.
CPC ....... *G06Q 30/0633* (2013.01); *G06F 3/0482* (2013.01); *G06F 9/451* (2018.02)

(58) Field of Classification Search
CPC .... G06Q 30/0633; G06F 9/451; G06F 3/0482
See application file for complete search history.

(56) References Cited

U.S. PATENT DOCUMENTS

| | | | | |
|---|---|---|---|---|
| 2014/0074649 A1* | 3/2014 | Patel | .................. | G06Q 30/0631 705/26.7 |
| 2019/0340700 A1* | 11/2019 | Haas | ....................... | G06Q 40/12 |
| 2022/0076315 A1* | 3/2022 | Angeli | ............... | G06Q 30/0257 |
| 2022/0164864 A1* | 5/2022 | Li | .......................... | G06F 16/958 |
| 2022/0207581 A1* | 6/2022 | Desrosiers | ......... | G06Q 30/0639 |

OTHER PUBLICATIONS https://pokemonbaribarijapan.com/collections/loose-packs/products/pokemon-trading-card-game-5-packs-of-silver- lance?variant=39627215995064. Retrieved from the internet Jul. 8, 2022, 3 pages.
https://pokemonbaribarijapan.com/collections/claim-sales. Retrieved from the internet Jul. 8, 2022, 8 pages.
https://pokemonbaribarijapan.com/pages/queue. Retrieved from the internet Jul. 8, 2022, 3 pages.
https://pokemonbaribarijapan.com/pages/timestamps. Retrieved from the internet, Jul. 11, 2022, 3 pages.
https://pokemonbaribarijapan.com/. Retrieved from the internet, Jul. 8, 2022, 9 pages.
https://lonestarpokemonbreaks.com/pages/personal-queue. Retrieved from the internet Jul. 11, 2022, 4 pages.

* cited by examiner

*Primary Examiner* — Anil K Bhargava
(74) *Attorney, Agent, or Firm* — Lowenstein Sandler LLP

(57) ABSTRACT

A method includes receiving an order request associated with a user and a first physical product, adding the order request to a list of order requests, and causing a first graphical user interface (GUI) to display a livestream video and the list of order requests. Responsive to receiving user selection of the order request from the list of order requests, the method further includes generating a timestamp associated with the user selection, and causing the first GUI to be updated to indicate the first physical product associated with the order request is being shown via the livestream.

18 Claims, 12 Drawing Sheets

PLATFORMS INTEGRATION SYSTEM

RELATED APPLICATIONS

This application claims the benefit of U.S. Provisional Application No. 63/227,716, filed Jul. 30, 2021, the contents of which are hereby incorporated by reference in their entirety.

TECHNICAL FIELD

Embodiments of the present disclosure relate to an integration systems, and in particular to platforms integration systems.

BACKGROUND

Different platforms perform different operations, such as processing orders, streaming videos, providing text conversation functionality, etc.

BRIEF DESCRIPTION OF THE DRAWINGS

The present disclosure is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION OF EMBODIMENTS

Figure 1:
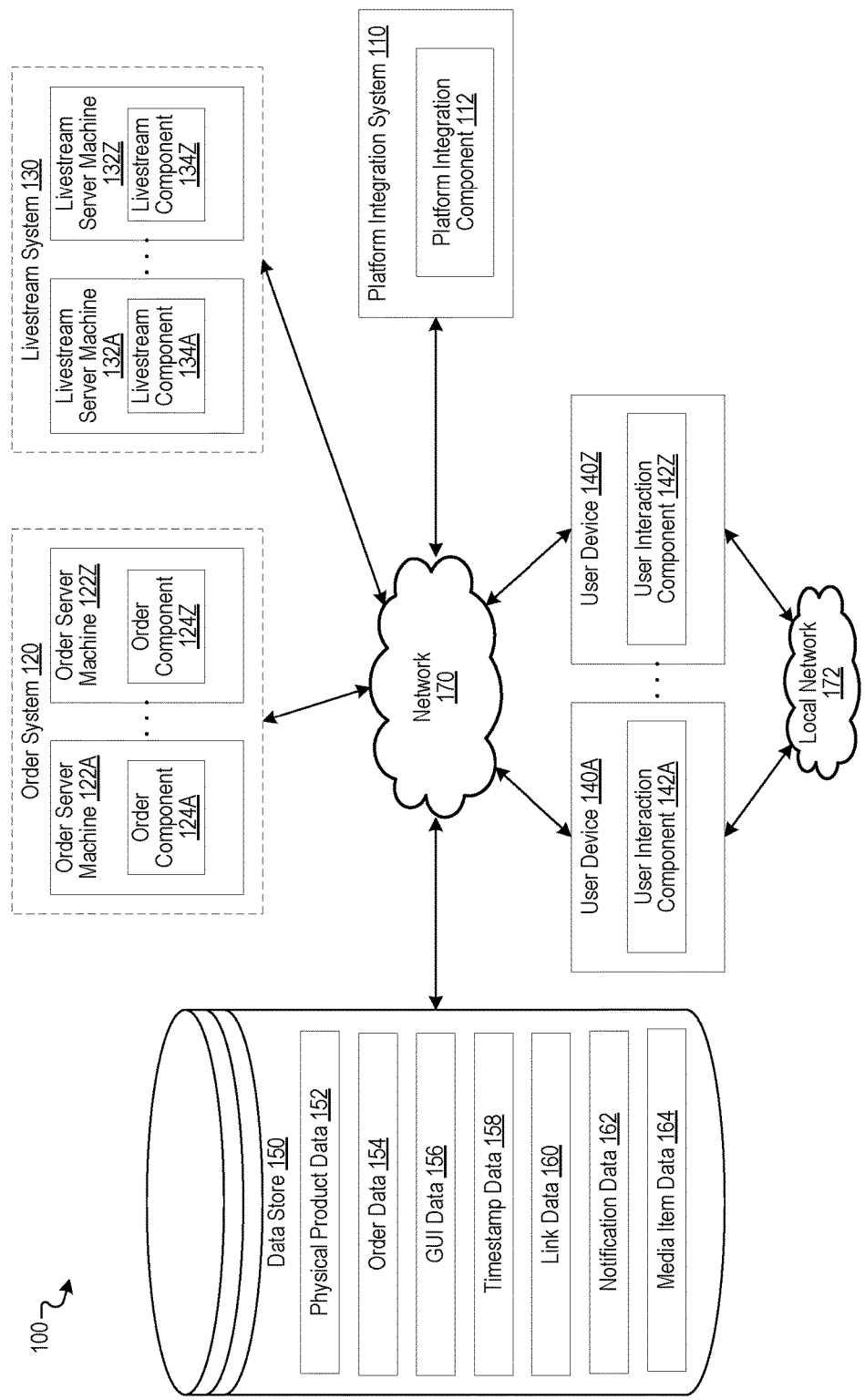
FIG. 1 is a block diagram illustrating an exemplary system architecture, according to certain embodiments.

Embodiments described herein are related to a platforms integration system.

Different platforms perform different operations, such as processing orders, streaming videos, providing text conversation functionality, etc. Different platforms can be associated with a physical product. Conventionally, coordination between the different platforms is a manual process. For example, an order associated with a user can be received for a physical product via a first platform and a video stream of the physical product (e.g., being opened, being unveiled, etc.) can be transmitted via a second platform. Conventionally, coordination of the order for the physical product and the video stream of the physical product uses a lot of user time and bandwidth, processor overhead, and energy consumption for the back and forth between devices for coordination. Conventional systems also are prone to errors and bandwidth, processor overhead, and energy consumption to correct the errors. For example, a user may receive the order from a first platform, may manually input (e.g., type) the order into a second platform, and may stream a video of a physical product via a third platform. Errors may occur in the user reading of the order from the first platform, the manual input of the order by the user into the second platform, the choosing of a physical product that is to match the order and capturing of a video of the physical product. Users later attempting to re-watch the video of the physical product may use bandwidth, processor overhead, energy consumption, and time, to seek and rewind the video until finally finding the correct portion of the video that corresponds to the physical product.

The devices, systems, and methods disclosed herein provide a platforms integration system. A processing device (e.g., of a platforms integration server) receives an order request associated with a user. In some embodiments, an order system (e.g., order server) receives the order request from a user device associated with the user and the processing device receives the order request from the order system (e.g., the platforms integration server and the order server are different servers). In some embodiments, the processing device receives the order request from the user device (e.g., the platforms integration server and the order server are the same server).

The processing device adds the order request to a list of order requests and causes a first graphical user interface (GUI) to display a livestream video and the list of order requests. In some embodiments, the list of order requests is overlaid on the livestream video. In some embodiments, the list of order requests is displayed to the side of the livestream video. In some embodiments, the livestream video includes the list of order requests.

The processing device receives a user selection (e.g., from the user device performing the livestreaming) of the order request from the list of the order requests. The user selection may be via the first GUI that is displaying the list of order requests. The user selection of the order request may be associated with the physical product (associated with the order request) that is being displayed (e.g., opened) via the video stream or is the next physical product to be displayed (e.g., opened) via the video stream.

Responsive to receiving user selection (e.g., from the user device performing the livestreaming) of the order request from the list of the order requests, the processing device generates a timestamp (e.g., point in time in the video stream) associated with the user selection, causes the first GUI to be updated to indicate a physical product associated with the order request is being displayed via the livestream, sends a notification to the user device of the user associated with the order request, adds the link to a list of timestamps, and causes a second GUI to display the list of timestamps and corresponding links.

Responsive to receiving the notification or interacting with the second GUI, the user device associated with the order request may receive user input selecting the link and the video stream at the point in time associated with the physical product (e.g., the opening of the physical product) may be displayed via the user device.

A text conversation may be displayed in conjunction with the livestream. In some embodiments, the processing device receives first user input (e.g., via the text conversation) associated with starting a claim process for a physical product. The first user input may include text (e.g., a special character and a word). The processing device may cause the first GUI to be updated to indicate that the claim process has started and may receive claim requests (e.g., via the text conversation) for the physical product (e.g., each claim request being associated with a user device). The processing device may receive second user input associated with ending of the claim process and may generate, based on the claim requests, order requests associated with the physical product. The processing device may cause a third GUI to be updated with the order requests and may send notifications to the user devices associated with the claim requests.

In some embodiments, the processing device (e.g., of the platforms integration system) may interface with multiple order platforms and/or may interface with multiple video streaming platforms.

The systems, devices, and methods disclosed herein have advantages over conventional solutions. The present disclosure may coordinate an order for a physical product and a video stream of the physical product without errors and user time associated with conventional systems. This causes the present disclosure to use less bandwidth, processor overhead, and energy consumption compared to conventional systems. The present disclosure may provide a link to the portion of the video associated with the physical product compared to conventional solutions where the user is to seek and rewind in the video to find the correct portion. This also reduces bandwidth, processor overhead, and energy consumption compared to conventional solutions.

Although some embodiments of the present disclosure are described in relation to streaming openings of packs of cards (e.g., breakings, openings, rip and ship, etc.), the present disclosure in some embodiments is used in relation to display of other physical products, such as figurines, stuffed plush toys (e.g., plushies), blind bags, etc. Although some embodiments of the present disclosure are used to display physical products purchased in real time, the present disclosure in some embodiments is used with physical products that are not purchased.

FIG. 1 is a block diagram illustrating an exemplary system 100 (exemplary system architecture), according to certain embodiments.

System 100 includes platform integration system 110, order system 120, livestream system 130, user devices 140, and data store 150. In some embodiments, platform integration system 110 is a platform integration server. In some embodiments, order system 120 includes one or more order server machines 122 (e.g., order servers). In some embodiments, livestream system 130 includes one or more livestream server machines 132 (e.g., livestream servers).

In some embodiments, one or more of platform integration system 110, order system 120, livestream system 130, user devices 140, and/or data store 150 are coupled to each other via a network 170 (e.g., for platforms integration). In some embodiments, network 170 is a public network that provides user device 140 with access to one or more of platform integration system 110, order system 120, livestream system 130, user devices 140, data store 150, and/or other publically available computing devices. In some embodiments, network 170 is a private network that provides user device 140 access to one or more of platform integration system 110, order system 120, livestream system 130, user devices 140, data store 150, and/or other privately available computing devices. In some embodiments, network 170 includes one or more Wide Area Networks (WANs), Local Area Networks (LANs), wired networks (e.g., Ethernet network), wireless networks (e.g., an 802.11 network or a Wi-Fi® network), cellular networks (e.g., a Long Term Evolution (LTE) network), radar units, transmission antenna, reception antenna, microwave transmitter, microwave receiver, sonar devices, Lidar devices, routers, hubs, switches, server computers, cloud computing networks, and/or a combination thereof.

In some embodiments, one or more user devices 140A-Z communicate with each other. In some embodiments, user device 140A receives data (e.g., instructions, user input, user selection, etc.) from one or more of user input via user device 140A, platform integration system 110, order system 120, livestream system 130, and/or data store 150 and provides the data to one or more user devices 140B-Z. In some embodiments, user device 140A receives data (e.g., instructions, user input, user selection, etc.) from one or more user devices 140B-Z and provides the data to one or more of platform integration system 110, order system 120, livestream system 130, and/or data store 150.

In some embodiments, one or more user devices 140A-Z communicate over network 170. In some embodiments, one or more user devices 140A-Z communicate over a local network 172. Local network 172 may be a computing network that provides one or more communication channels between user devices 140. In some examples, local network 172 is a peer-to-peer network that does not rely on a pre-existing network infrastructure (e.g., access points, switches, routers) and user devices 140 replace the networking infrastructure to route communications between the user devices 140. Local network 172 may be a wireless network that is self-configuring and enables user devices 140 to contribute to local network 172 and dynamically connect and disconnect from local network 172 (e.g., ad hoc wireless network). In some examples, local network 172 is a computing network that includes networking infrastructure that enables user devices 140 to communicate with other user devices 140. The local network 172 may or may not have access to the public network (e.g., internet, network 170). For example, an access point or device that may function as an access point to enable user devices 140 to communicate with one another without providing internet access. In some embodiments, the local network 172 provides access to a larger network such as network 170 (e.g., Internet). In some embodiments, local network 172 is based on any wireless or wired communication technology and may connect a first user device 140 directly or indirectly (e.g., involving an intermediate device, such as an intermediate user device 140) to a second user device 140. The wireless communication technology may include Bluetooth®, Wi-Fi®, infrared, ultrasonic, or other technology. The wired communication may include universal serial bus (USB), Ethernet, RS 232, or other wired connection. The local network 172 may be an individual connection between two user devices 140 or may include multiple connections.

In some embodiments, the user device 140 includes a computing device such as Personal Computers (PCs), laptops, mobile phones, smart phones, tablet computers, netbook computers, gateway device, etc. In some embodiments, the user device 140 includes a user interaction component 142. User device 140 includes an operating system that allows users to one or more of generate, view, or edit data (e.g., providing an order request for a physical product, etc.).

In some embodiments, the order system 120 (e.g., order server machine 122), livestream system 130 (e.g., livestream server machine 132), and/or platform integration system 110 each include one or more computing devices such as a rackmount server, a router computer, a server computer, a personal computer, a mainframe computer, a laptop computer, a tablet computer, a desktop computer, Graphics Processing Unit (GPU), accelerator Application-Specific Integrated Circuit (ASIC) (e.g., Tensor Processing Unit (TPU)), etc.

In some embodiments, the data store 150 is memory (e.g., random access memory), a drive (e.g., a hard drive, a flash drive), a database system, or another type of component or device capable of storing data. In some embodiments, data store 150 includes multiple storage components (e.g., multiple drives or multiple databases) that span multiple computing devices (e.g., multiple server computers). In some embodiments, the data store 150 stores one or more of physical product data 152, order data 154, GUI data 156, timestamp data 158, link data 160, notification data 162, media item data 164, and/or the like.

Physical product data 152 includes data associated with a physical product to be displayed (e.g., opened, unveiled, etc.) via the media item (e.g., livestream video, recorded video, etc.). The physical product data 152 can include a description of the physical product, an identifier of the physical product, a quantity of the physical product, and/or the like.

Order data 154 includes data associated with an order or claim for a physical product that is available to be requested or that has been requested. Order data 154 can include data associated with the physical product (e.g., identifier, quantity, etc.), data associated with the user providing the physical product, data associated with the user requesting the physical product, data associated with when the physical product is available to be ordered or claimed, data associated with the order request or order request, data associated with fulfilment of the order request or claim request, and/or the like.

Figure 4A:
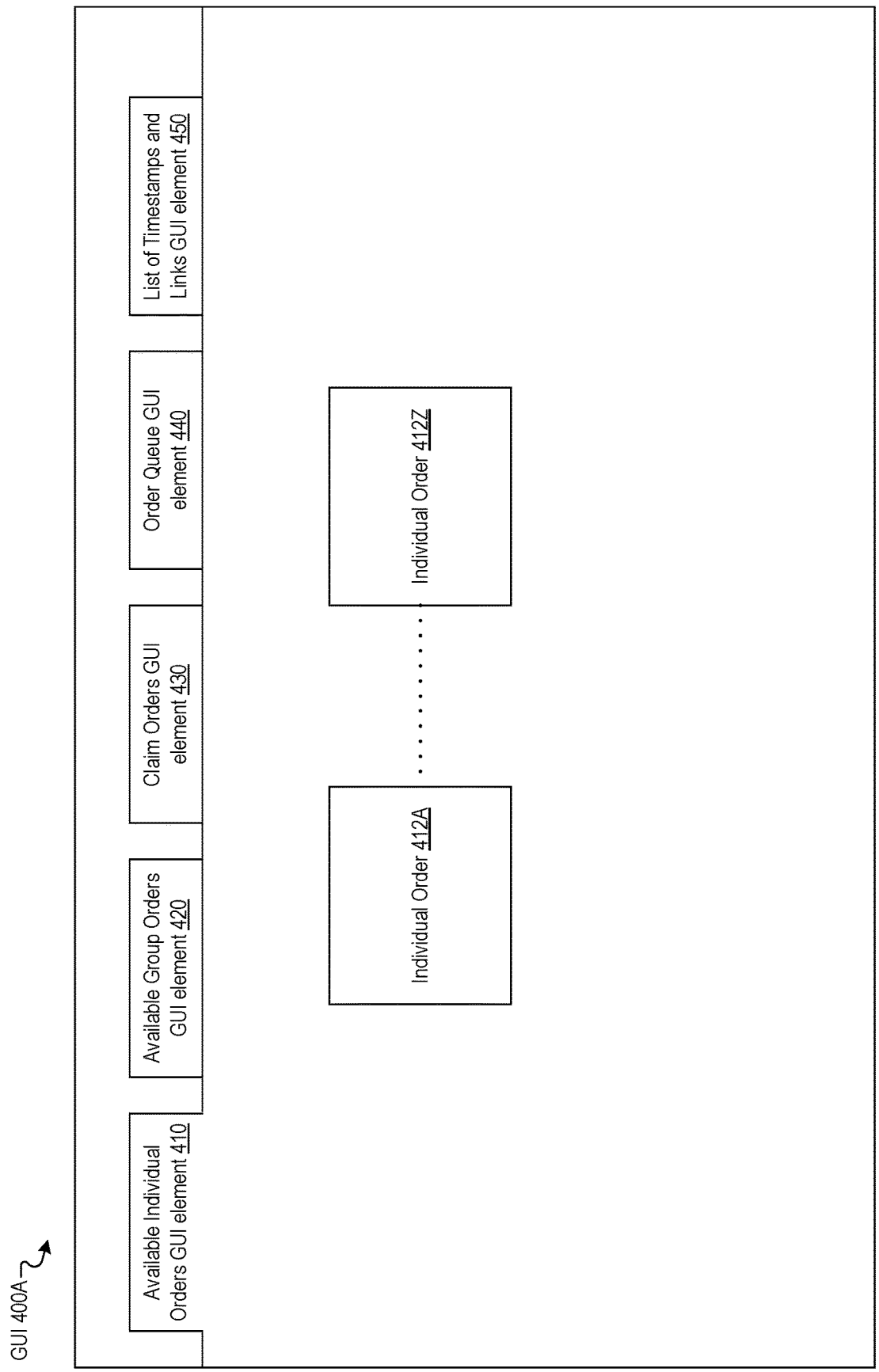
FIGS. 4A-E illustrate graphical user interfaces used with a platforms integration system, according to certain embodiments.
Figure 4B:
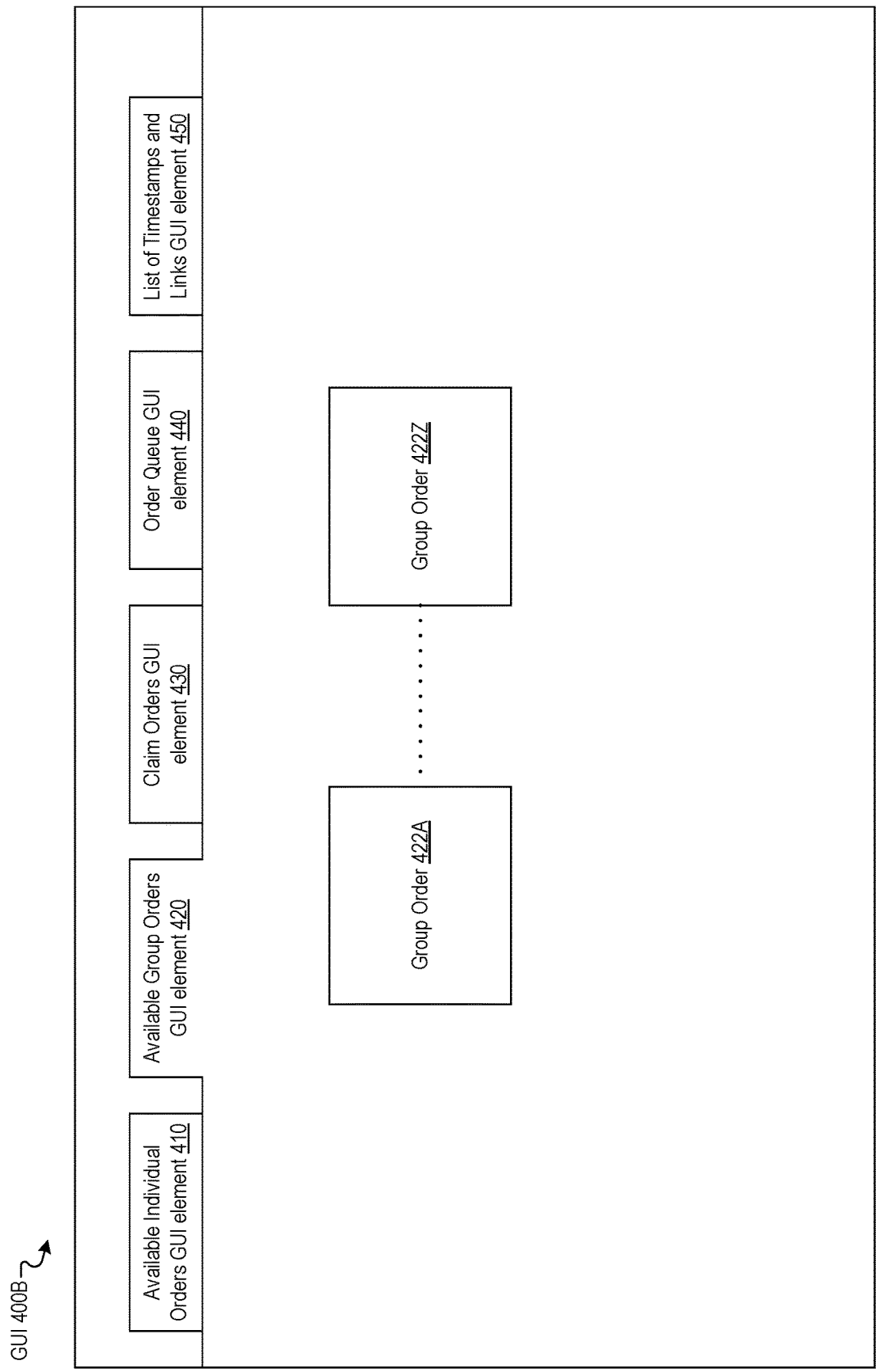
Figure 4C:
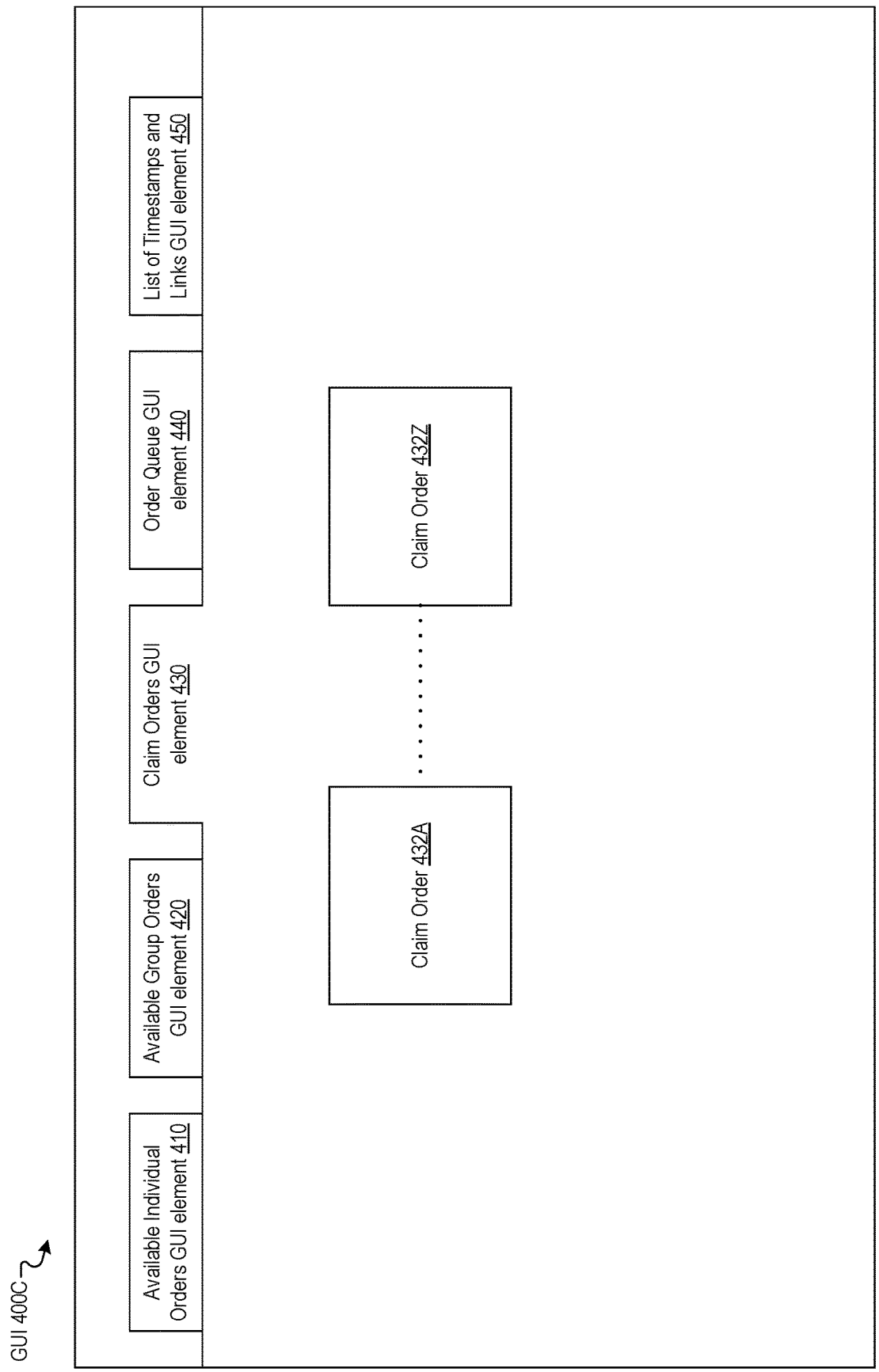
Figure 4D:
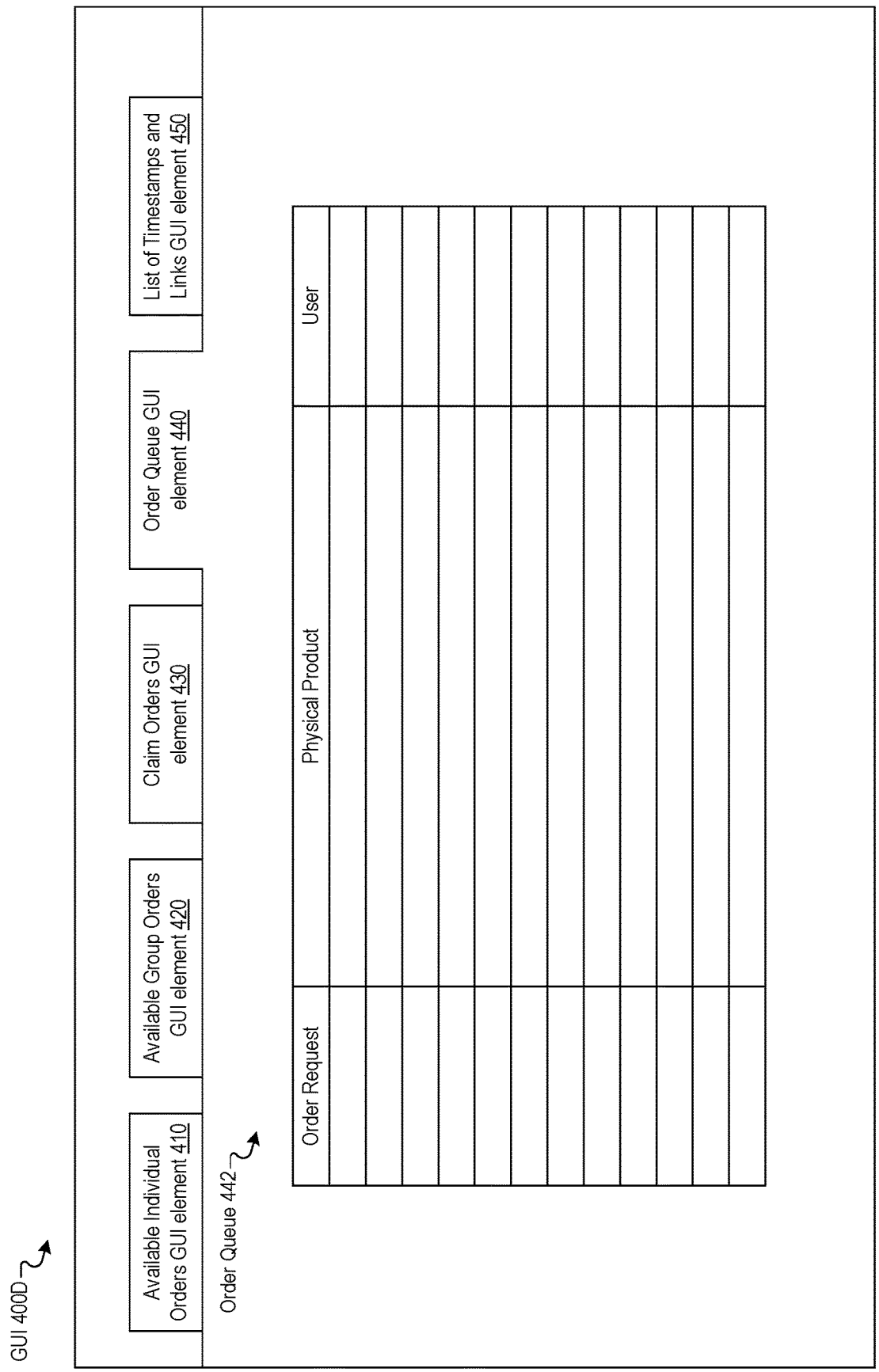
Figure 4E:
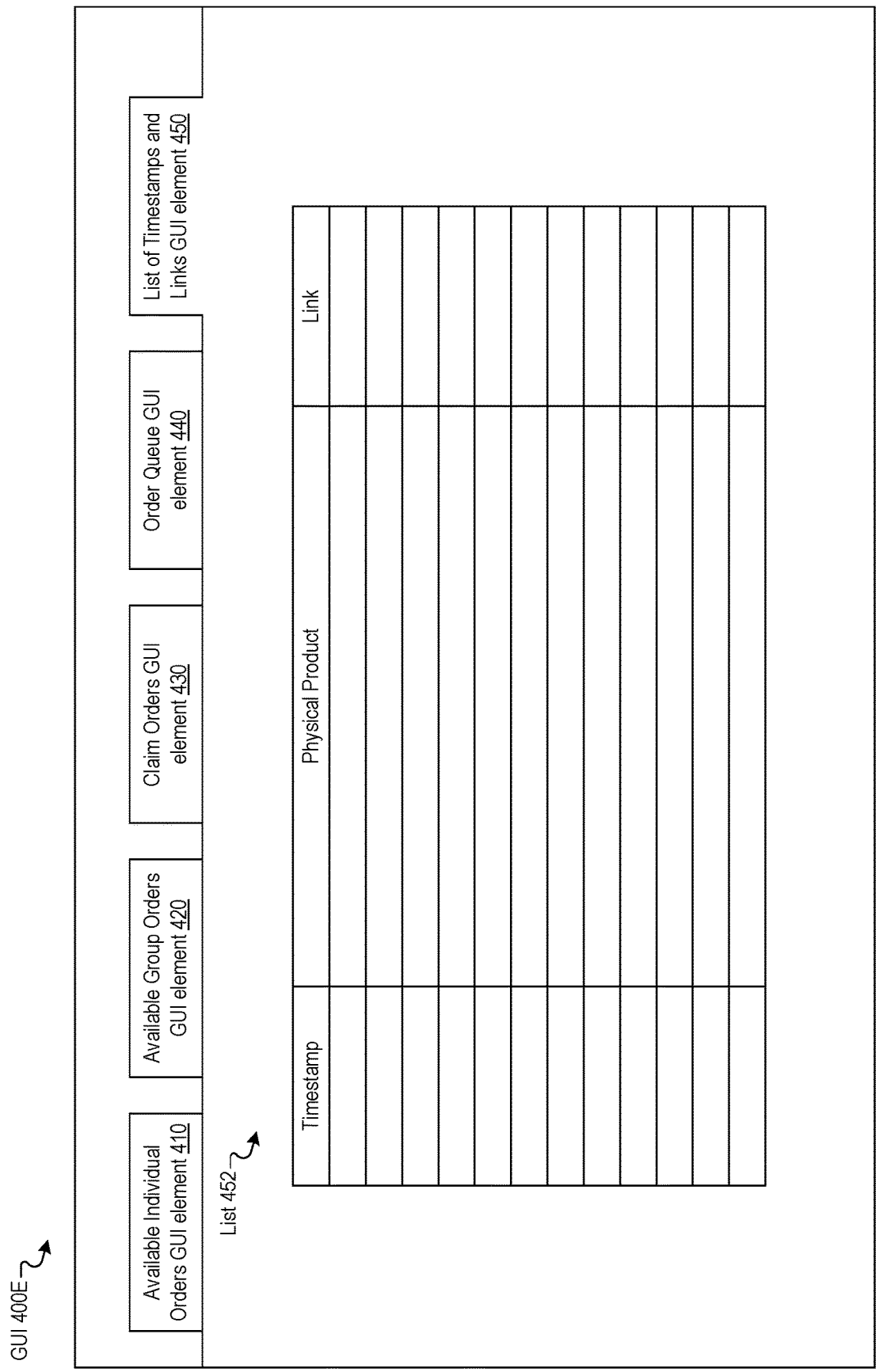
Figure 5:
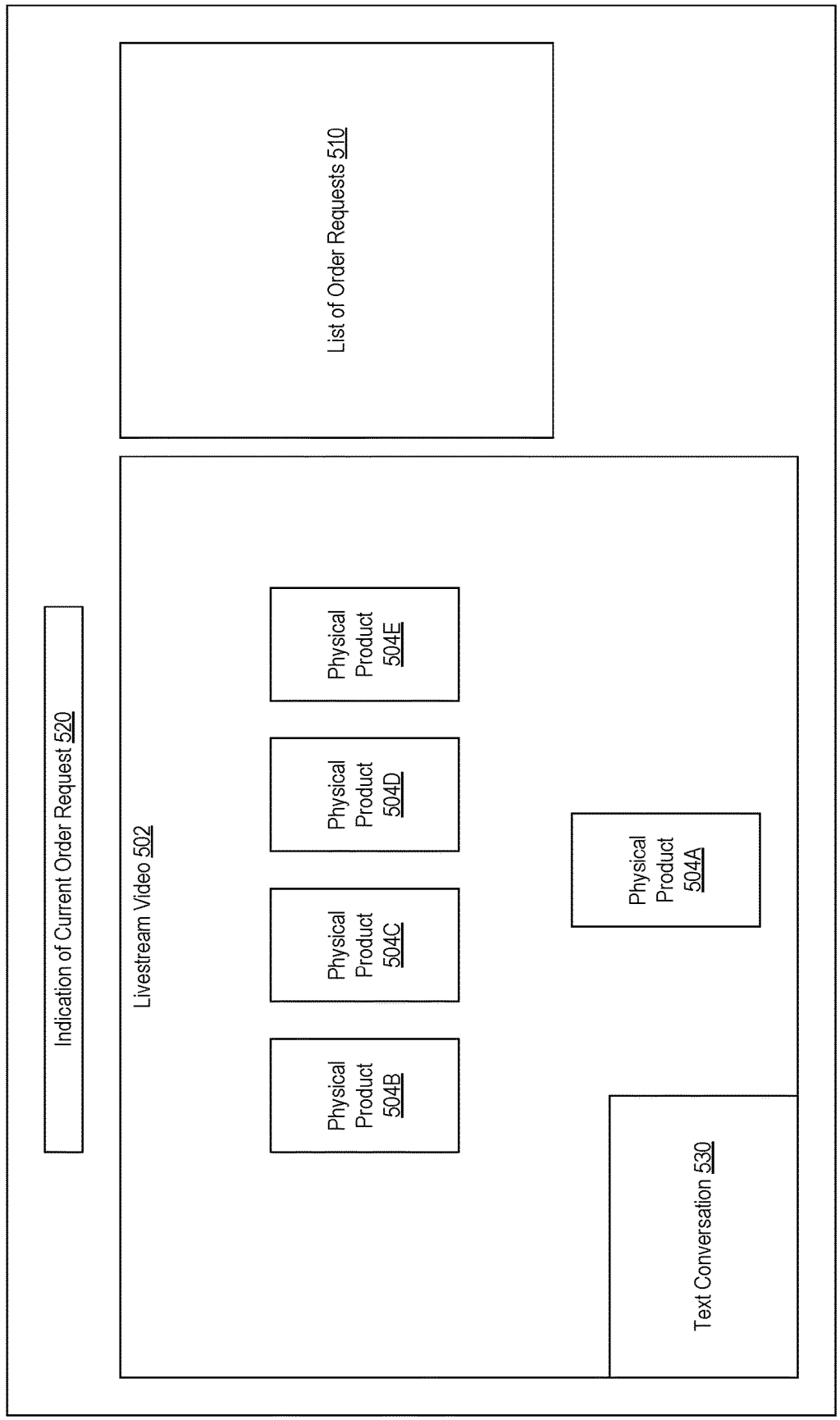
FIG. 5 illustrates a graphical user interface used with a platforms integration system, according to certain embodiments.

GUI data 156 includes data associated with one or more GUIs (e.g., GUIs 400A-E of FIGS. 4A-E, GUI 500 of FIG. 5). GUI data 156 may include data associated with placement of content on the GUIs, timestamps of change of data on the GUIs, and/or the like.

Timestamp data 158 includes data associated with a point in time (e.g., timestamp) in a media item (e.g., livestream video). For example, responsive to user input indicating that a physical product is to be displayed (e.g., opened, unwrapped, unveiled, etc.), a timestamp may be generated associated with the point of time of the user input. The timestamp may be used to access a point in time in a media item when the physical product was displayed.

Link data 160 includes data associated with a point in time in a media item. The link data 160 may include links to a point in time in a media item. For example, the link may be a uniform resource locator (URL) (e.g., web address, reference to a web resource) that includes a temporal identifier (e.g., &t=1m30s or ?t=1m30s to access a point in time of one minute and thirty seconds from the beginning of the media item). The URL may include the temporal identifier at the end of the URL.

Notification data 162 includes data associated with sending a notification to a user device. The notification may include an order request or a claim request, a link to the order request or the claim request displayed on a GUI, a link to point in time in a media item associated with the order request or the claim request (e.g., the timestamp when the physical product associated with the order request or the claim request was displayed), and/or the like. The notification data 162 may include data associated with the notification, data associated with when the notification was sent, data associated with where the notification was sent, and/or the like.

Media item data 164 includes data associated with a media item, such as a livestream video or a recorded livestream video. The media item data 164 may include the media item, a link (e.g., URL) to the media item, a link to a webpage displaying the media item, data associated with when the livestream video was livestreamed, and/or the like.

In some embodiments, the platform integration system 110 includes a platform integration component 112. The platform integration component 112 may include one or more of the operations of FIGS. 2A-B and 3A-B.

In some embodiments, the user device 140 includes a user interaction component 142. The user interaction component 142 may perform one or more of the operations of FIGS. 2A-B.

Figure 2A:
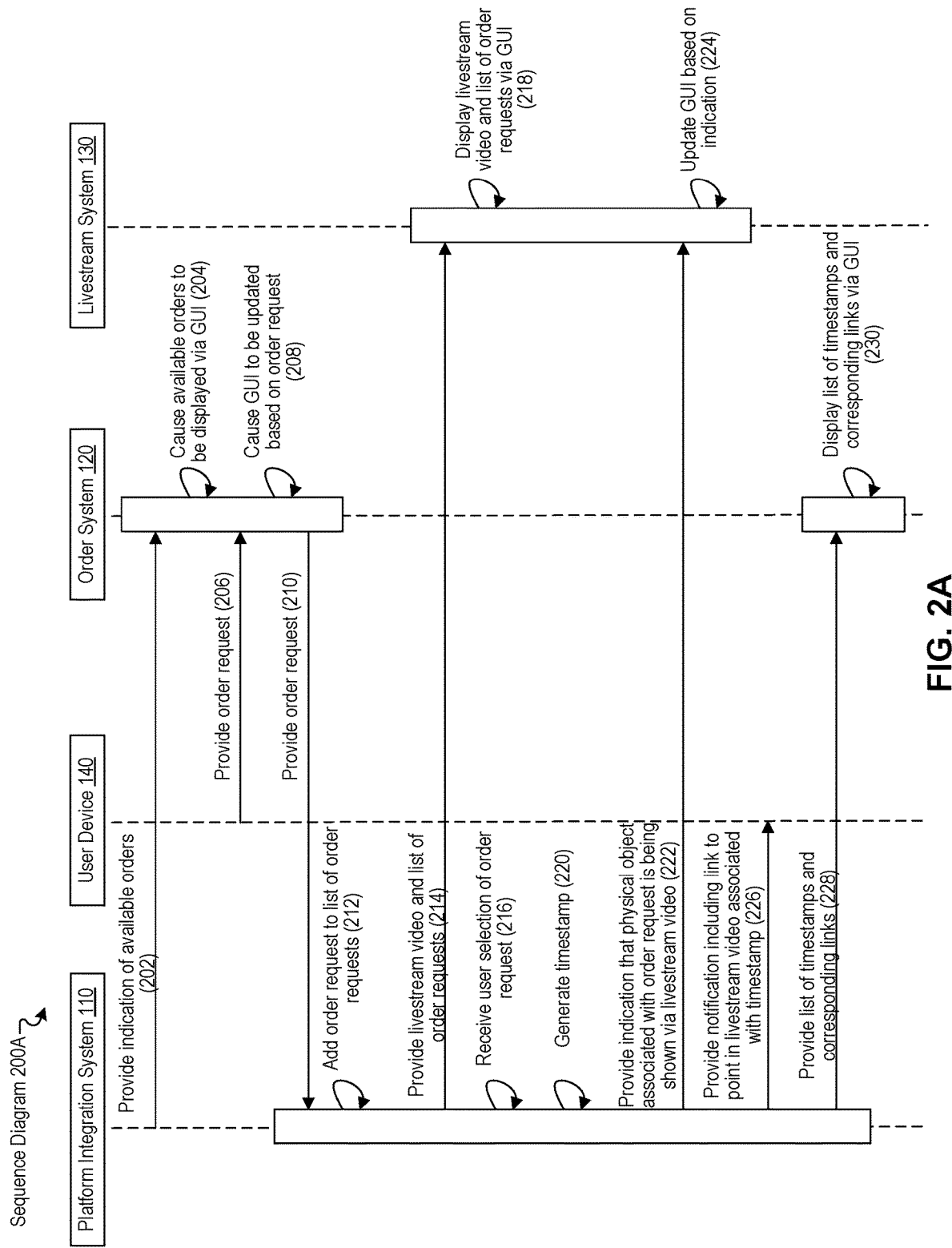
FIGS. 2A-B illustrate sequence diagrams associated with a platforms integration system, according to certain embodiments.
Figure 2B:
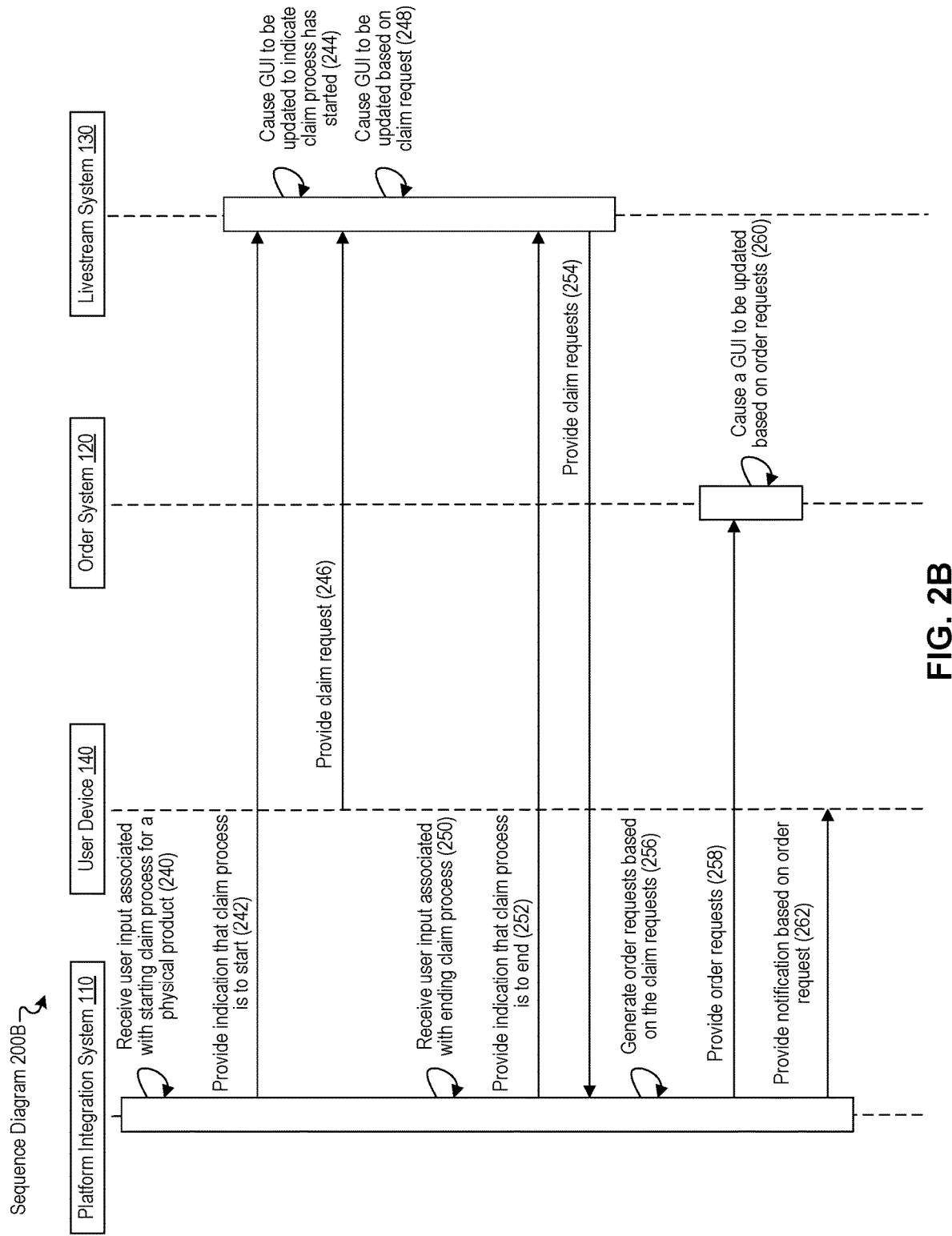

The order system 120 (e.g., order server machine 122) may include an order component 124 which may perform one or more of the operations of FIGS. 2A-B.

The livestream system 130 (e.g., livestream server machine 132) may include a livestream component 134 which may perform one or more of the operations of FIGS. 2A-B.

In some embodiments, the functions of two or more of platform integration system 110, order system 120, livestream system 130, and user device 140 are be provided by a fewer number of machines. For example, in some embodiments, order server machine 122 and livestream server machine 132 are integrated into a single machine. In some embodiments, order server machine 122 and platform integration system 110 are integrated into a single machine. In some embodiments, livestream server machine 132 and platform integration system 110 are integrated into a single machine.

In general, functions described in one embodiment as being performed by user device 140, order system 120, and/or livestream system 130 can also be performed on platform integration system 110 in other embodiments, if appropriate. In addition, the functionality attributed to a particular component can be performed by different or multiple components operating together.

In some embodiments, the user interaction component 142 is part of the platform integration system 110. In some embodiments, the platform integration component 112 is part of the user device 140.

In addition, the functions of a particular component can be performed by different or multiple components operating together. In some embodiments, one or more of the platform integration system 110, order system 120, or livestream system 130 are accessed as a service provided to other systems or devices through appropriate application programming interfaces (API).

In some embodiments, a "user" is represented as a single individual. However, other embodiments of the disclosure encompass a "user" being an entity controlled by a plurality of users and/or an automated source. In some examples, a set of individual users federated as a group of administrators is considered a "user."

FIGS. 2A-B illustrate sequence diagrams 200A-B associated with a platforms integration system, according to certain embodiments.

For simplicity of explanation, sequence diagrams 200A-B are depicted and described as a series of operations. However, operations in accordance with this disclosure can occur in various orders and/or concurrently and with other operations not presented and described herein. Furthermore, in some embodiments, not all illustrated operations are performed to implement sequence diagrams 200A-B in accordance with the disclosed subject matter. In addition, those skilled in the art will understand and appreciate that sequence diagrams 200A-B could alternatively be represented as a series of interrelated states via a state diagram or events.

Referring to FIG. 2A, sequence diagram 200A includes a platform integration system 110, a user device 140, an order system 120, and a livestream system 130.

At block 202, platform integration system 110 (e.g., platform integration component 112) provides an indication of available orders to order system 120. The indication of available orders may include identifiers, description, quantity, and/or the like of physical products that are available. The indication of available orders may indicate whether the order is an individual order (e.g., one user provides an order request for the physical product) or a group order (e.g., multiple users provide an order request for a portion of the physical product). For example, if a physical product is a set of cards where a first subset of the cards are associated with a first identifier, a second subset of the cards are associated with a second identifier, a group order may be associated with a first order for the first subset of the cards and a second order for the second subset of the cards. An order request for a group order may be transmitted only after all of the subsets of the group order are selected by a user.

At block 204, the order system 120 causes available orders (e.g., from block 202) to be displayed via a GUI (e.g., GUI 400A of FIG. 4A, GUI 400B of FIG. 4B). The GUI may be available to be viewed by user device 140 and/or platform integration system 110.

At block 206, user device 140 provides an order request to the order system 120. The user device 140 may display the GUI of available orders, receive user input of selecting an available order displayed via the GUI, and provide the order request to the order system 120.

At block 208, the order system 120 causes the GUI (e.g., GUI 400A of FIG. 4A, GUI 400B of FIG. 4B) to be updated based on the order request (e.g., removing the available individual order from the GUI, removing at least a portion of the available group order from the GUI, etc.).

At block 210, the order system 120 provides the order request to the platform integration system 110. In some embodiments, the order request is provided as JSON (JavaScript Object Notation) and includes order number, identifier of user account (e.g., corresponding to user device 140 that provided order request to the order system 120), identifier of physical product associated with the order request, etc.

At block 212, the platform integration system 110 adds the order request to a list of order requests (e.g., queue of order requests). The platform integration system 110 may cause the list of order requests to be displayed via a GUI (e.g., order queue of GUI 400D of FIG. 4D).

At block 214, the platform integration system 110 provides a livestream video and a list of order requests to the livestream system 130. In the livestream video, different physical products associated with the different purchase requests are to be displayed at different points in time. In some embodiments, the physical products are unwrapped, unboxed, revealed, unveiled, torn open, etc. at different points in time in the livestream video.

At block 216, the livestream system 130 causes a livestream video and list of order requests to be displayed via a GUI (e.g., GUI 500 of FIG. 5). The list of order requests may be displayed next to the livestream video, be part of the livestream video, be overlaid on the livestream video, and or the like.

At block 218, the platform integration system 110 receives a user selection of the order request. The user selection may be by the user capturing and transmitting the livestream video. When it is time to display (e.g., unwrap) a certain physical product, the user may provide the user selection).

At block 220, the platform integration system 110 generates a timestamp (e.g., responsive to the user selection of block 216).

At block 222, the platform integration system 110 provides an indication to the livestream system that the physical product associated with the order request is being shown via the livestream video.

At block 224, the livestream system 130 updates the GUI based on the indication. The livestream system 130 may update the indication of current order request associated with a physical product being displayed via the livestream (e.g., see GUI 500 on FIG. 5).

At block 226, platform integration system 110 provides a notification including the link to the point in the livestream video associated with the timestamp to the user device 140.

At block 228, the platform integration system 110 provides a list of timestamps and corresponding links to the order system 120

At block 230, the order system 120 causes the list of timestamps and corresponding links to be displayed via a GUI (e.g., see GUI 400E of FIG. 4E).

Referring to FIG. 2B, sequence diagram 200B also includes a platform integration system 110, a user device 140, an order system 120, and a livestream system 130.

At block 240, platform integration system 110 (e.g., platform integration component 112) receives user input associated with starting a claim process for a physical product. In some embodiments, there are multiple of the physical product available. In some embodiments, the user input is text to be input into a text conversation hosted by the livestream system.

At block 242, the platform integration system 110 provides the indication that claim process is to start to the livestream system. In some embodiments, block 242 includes providing the text received at block 240 to the text conversation of livestream system 130.

At block 244, the livestream system 130 causes a GUI to be updated to indicate the claim process has started. At block 244, the livestream system 130 may update the text conversation based on the text received in 242 to indicate the claim process has started.

At block 246, user device 140 provides a claim request to the livestream system 130. The claim request may indicate a quantity of the physical product that is being requested. In some embodiments, the user device 140 provides a single claim request for a specific quantity of the physical product. In some embodiments, the user device provides multiple claim requests for the physical product (e.g., two separate claim requests if requesting two of the physical product). The claim request may be user input of text received by the user device 140 and provided to the text conversation hosted by the livestream system 130.

At block 248, the livestream system 130 causes a GUI to be updated based on the claim request. At block 244, the livestream system 130 may update the text conversation based on the text received in 246 to indicate the claim request by the user of user device 140.

At block 250, the platform integration system 110 receives user input associated with ending the claim process. In some embodiments, the user input is text to be input into the text conversation hosted by the livestream system.

At block 252, the platform integration system 110 provides the indication that the claim process is to end to the livestream system 130. In some embodiments, block 242 includes providing the text received at block 250 to the text conversation of livestream system 130.

At block 254, the livestream system 130 provides the claim requests to the platform integration system 110. The claim requests may be an indication of which users provided user input of a claim request between the time of starting the claim process and ending the claim process.

At block 256, the platform integration system 110 generates order requests based on the claim requests. Each order request may indicate the physical product associated with the claim process. Each order request may indicate the user with which the claim request is associated.

In some embodiments, there are more physical products requested via the claim requests than quantity of physical products that are available. The platform integration system 110 may determine whether there are more unique users associated with the claim requests than available physical products.

Responsive to the number of unique users being less than or equal to the number of physical products available, the platform integration system 110 generates an order request for each unique user. Responsive to more physical products being requested than quantity of physical products available, the platform integration system 110 randomly selects users that requested more than one of the physical product to receive more physical products and adds the additional physical products to the order requests.

Responsive to the number of unique users being greater than the number of physical products available, the platform integration system 110 randomly selects users and generates order requests (e.g., for one physical product for each unique user).

At block 258, the platform integration system 110 provides the order requests to the order system 120. The order requests may indicate a quantity of physical products allocated to a user based on the claim requests.

At block 260, the order system 120 updates a GUI based on the order requests. The GUI may indicate one or more of the claim request, a user identifier, quantity of physical product, description of physical product, and/or the like.

At block 262, platform integration system 110 provides a notification to the user device based on the order request. The notification may include an indication of the physical product, a quantity of the physical product, a link to the GUI based on the order request, and/or the like.

Figure 3A:
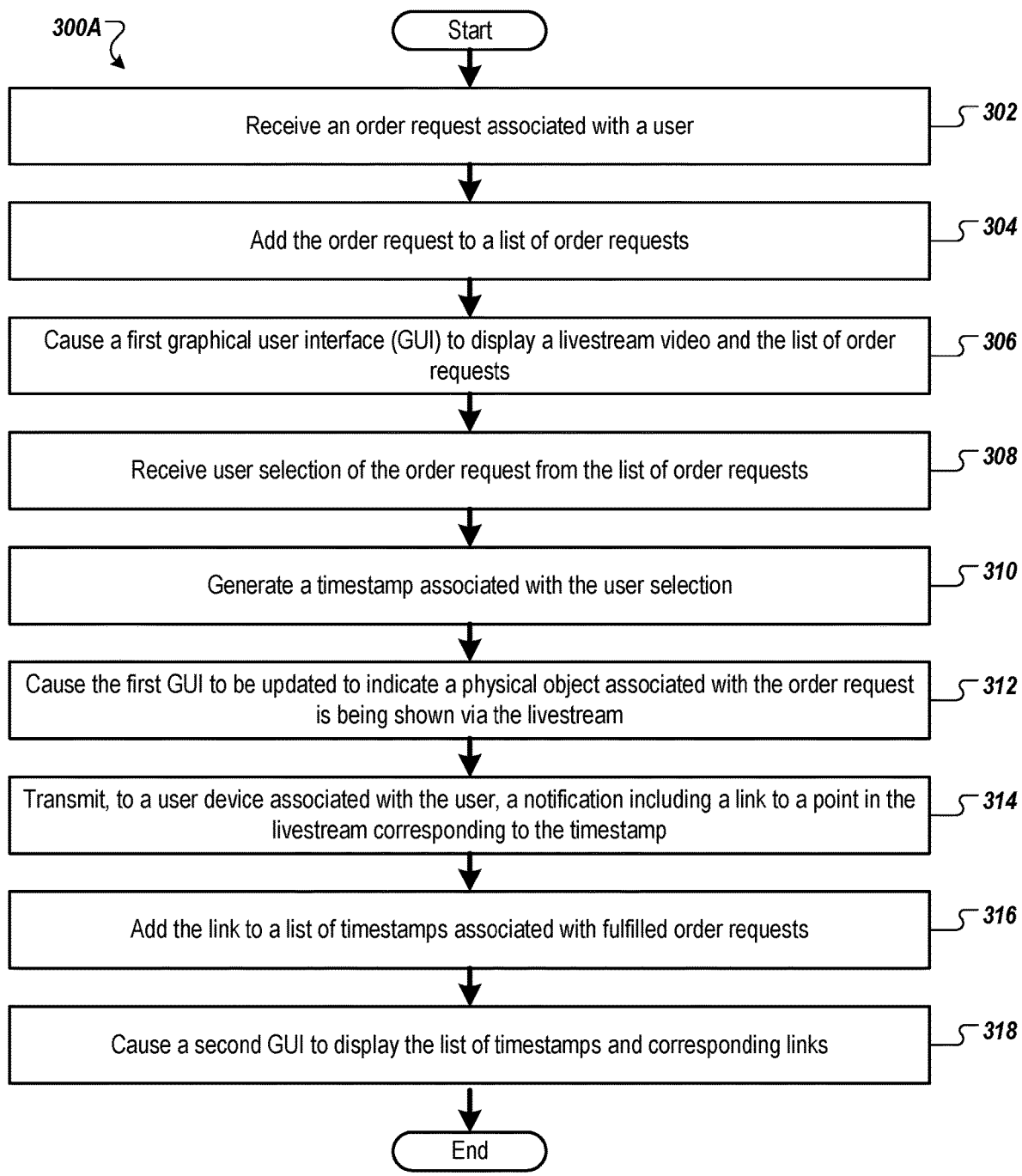
FIGS. 3A-B illustrate flow diagrams of methods associated with a platforms integration system, according to certain embodiments.
Figure 3B:
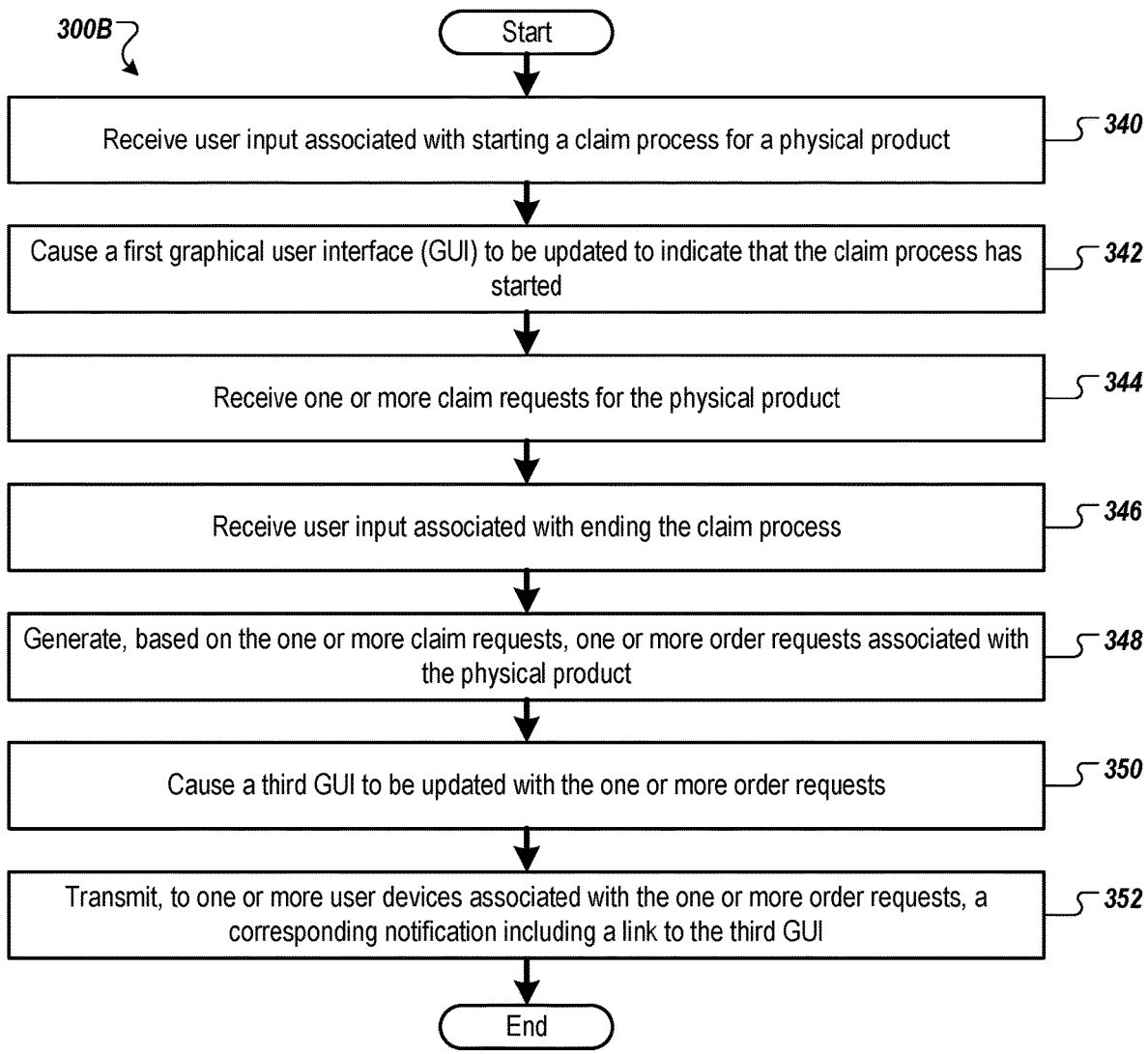

FIGS. 3A-B illustrate flow diagrams of methods 300A-B associated with a platforms integration system, according to certain embodiments. In some embodiments, methods 300A-B are performed by processing logic that includes hardware (e.g., circuitry, dedicated logic, programmable logic, microcode, processing device, etc.), software (such as instructions run on a processing device, a general purpose computer system, or a dedicated machine), firmware, microcode, or a combination thereof. In some embodiment, one or more of methods 300A-B are performed, at least in part, by platform integration system 110 (e.g., platform integration component 112) of FIG. 1. In some embodiments, a non-transitory machine-readable storage medium stores instructions that when executed by a processing device, cause the processing device to perform one or more of methods 300A-B.

For simplicity of explanation, methods 300A-B are depicted and described as a series of operations. However, operations in accordance with this disclosure can occur in various orders and/or concurrently and with other operations not presented and described herein. Furthermore, in some embodiments, not all illustrated operations are performed to implement methods 300A-B in accordance with the disclosed subject matter. In addition, those skilled in the art will understand and appreciate that methods 300A-B could alternatively be represented as a series of interrelated states via a state diagram or events.

Referring to FIG. 3A, at block 302 the processing logic receives an order request associated with a user. The order request may be associated with a physical product (e.g., pack of cards). In some embodiments, the order request is an individual order request (e.g., the user associated with the order request will receive all of the physical product, such as all of the cards in the pack of cards). In some embodiments, the order request is a group order request (e.g., the user associated with the group order request will receive a subset of the physical product, such as all of the cards of a certain type of the pack of cards. The order request may be received by an order system (e.g., order server machine, order component) from a user device associated with the user and the processing logic (e.g., of platform integration system) may receive the order request from the order system via a network. The order request may indicate the physical product, the user that placed the order, whether the order is request is complete, and/or the like.

At block 304, processing logic adds the order request to a list of order requests. The processing logic may store the list of order requests in a data store (e.g., database, spreadsheet, etc.). The list of order requests may specify the physical product, the user, and/or the like.

At block 306, processing logic causes a first GUI to display a livestream video and the list of order requests. The processing logic may receive the livestream video from an imaging device (e.g., camera, video camera, etc.). The livestream video may include both live video and live audio. In the first GUI, the list of order requests may be displayed next to or on the livestream video. In the first GUI, the list of order requests may be part of the livestream video. The sequential order (e.g., top to bottom) of order requests in the list of order requests may be associated with sequential order (e.g., first is on top, second is below the top order request) that the order requests will be processed (e.g., the sequential order that associated physical products will be displayed). In some embodiments, the first GUI of block 306 includes one or more of the features of GUI 500 of FIG. 5.

At block 308, processing logic receives user selection of the order request from the list of order requests. In some embodiments, the livestream video is of the user displaying (e.g., and opening) physical products and the user selection of block 308 is from the same user that is displaying (and opening) the physical products. The user may be controlling (e.g., may be an administrator of) the livestream video and/or operating (e.g., an administrator, an operator) of the livestream integration system. The administrator of the platform integration system may click on each order request the administrator is about to display and/or open the physical product associated with the order request. In response to receiving the user selection of the order request at block 308, the processing logic may cause one or more of the operations of blocks 310-318. In some embodiments, processing logic causes each of blocks 310-318 to happen substantially simultaneously (e.g., in real-time) responsive to block 308.

At block 310, processing logic generates a timestamp associated with the user selection. The timestamp may be a quantity of time relative to the beginning of the livestream video (e.g., hours, minutes, and/or seconds since the livestream video started). As the livestream video is being streamed or after the conclusion of the livestream video, the livestream video may be stored in a data store and the timestamp may be associated with a point in time (e.g., starting point) in the livestream video that is associated with the displaying and/or opening of the physical product associated with the order request and user selection.

At block 312, processing logic causes the first GUI to be updated to indicate a physical product associated with the order request is being shown via the livestream. The first GUI may display an indication of the current order request (e.g., see GUI 500 of FIG. 5). The indication may include an identifier of the order request, an identifier of the physical product, a descriptor of the physical product, an image of the physical product, an identifier of the user associated with the order request, and/or the like.

At block 314, processing logic transmits, to a user device associated with the user, a notification including a link to a point in time in the livestream video corresponding to the timestamp. The notification may be an electronic communication (e.g., email, text, message, notification in an application executing on the user device, etc.). The livestream video may be stored in a data store and the link may be to a point in time in the stored livestream video (e.g., a user does not need to seek and rewind to find the point in time).

At block 316, processing logic adds the link to a list of timestamps associated with fulfilled order requests. The processing logic may create a table (e.g., spreadsheet, data store, database, etc.) that includes timestamp, corresponding identifier of the physical product, corresponding identifier of the user associated with the order request for the physical product, the link to the point in time in the livestream video, and/or the like.

At block 318, processing logic causes a second GUI to display the list of timestamps and corresponding links. The second GUI may include one or more features of GUI 400E of FIG. 4E.

FIG. 3B may be associated with one or more of the same GUIs as FIG. 3A. Referring to FIG. 3B, at block 340 the processing logic receives user input associated with starting a claim process for a physical product. The user input may be by an administrator of the platform integration system. The user input may be via a text conversation (e.g., chat) hosted by the livestream system (e.g., !startclaim).

At block 342, processing logic causes a first GUI to be updated to indicate that the claim process has started. The processing logic may transmit the user input (e.g., text) to the livestream system to cause the first GUI (e.g., GUI 500 of FIG. 5) to indicate that the claim process has started. The indication may indicate which one or more physical products may be available through the claim process.

At block 344, processing logic receives one or more claim requests for the physical product. Each of the claim requests may be transmitted by a corresponding user device to the livestream system (e.g., via corresponding text entered via the text conversation). The livestream system may transmit the claim requests to the processing logic. The processing logic may read the claim requests (e.g., text) from the text conversation (e.g., via a bot). Each claim request may indicate a quantity of which physical product is requested.

At block 346, processing logic receives user input associated with ending the claim process. The user input may be by an administrator of the platform integration system (e.g., transmitted by the platform integration system to the livestream system) indicating that the claim process for each of the users has ended. The user input may be by a user of a user device (e.g., transmitted by the user device to the livestream system and from the livestream system to the platform integration system) indicating that the claim process for the user of the user device has ended (e.g., the claim process for other users is still available). The user input may be via text entered via the text conversation (e.g., !endclaim).

At block 348, processing logic generates, based on the one or more claim requests, one or more order requests associated with the physical product. The processing logic may select which claim requests are going to be granted.

In some embodiments, there are at least as many available physical products as there are claim requests and an order request is generated for each claim request. Responsive to multiple claim requests being received from the same user device (e.g., same user account, same user), the multiple claim requests may be bundled in one order request.

In some embodiments, there are as many available physical products as there are unique user accounts (e.g., user devices, users) and an order request is generated for each unique user account. If there are additional available physical products, the processing logic may randomize distribution of the additional available physical products to the unique user accounts that requested more than one physical product. In some embodiments, the processing logic provides the same amount of physical products to user accounts up to the maximum amount requested. For example, if there are 11 available physical products and a first user account requested 1 physical product, a second user account requested 2 physical products, a third user account requested 5 physical products, and a fourth user account requested 10 physical products, then the processing logic may provide 1 physical product to the first user account, 2 physical products to the second user account, 4 physical products to the third user account, and 4 physical products to the fifth user account. After selecting the amount of physical products for each user account, the processing logic generates the claim requests for the selected unique user accounts.

In some embodiments, there are less available physical products than unique user accounts (e.g., user devices, users). The processing logic may randomize distribution of the available physical products to the unique user accounts so that none of the unique user accounts receives more than one physical product. The processing logic then generates the claim requests for the selected unique user accounts.

At block 350, processing logic causes a third GUI to be updated with the one or more order requests. Each order request may have an identifier of the user account for which the order request was generated, an indication of the type and quantity of physical products corresponding to the order request, etc.

At block 352, processing logic transmits, to one or more user devices associated with the one or more order requests, a corresponding notification including a link to the third GUI. The corresponding notification may include an identifier of the user account for which the order request was generated, an indication of the type and quantity of physical products corresponding to the order request, etc.

FIGS. 4A-E illustrate graphical user interfaces (GUIs) 400A-E used with a platforms integration system, according to certain embodiments. In some embodiments, each of GUIs 400A-E are separate GUIs. In some embodiments, each of GUIs 400A-E are accessible via links (e.g., tabs, buttons, hyperlinks, etc.) from the same GUI (homepage). The order system 120 and/or platform integration system 110 may cause the GUIs 400A-E to be displayed via a user device 140.

Referring to FIG. 4A, GUI 400A illustrates available individual orders 412. GUI 400A may be accessed via an Available Individual Orders GUI element 410 (e.g., text, link, button, tab, etc.). GUI 400A may display individual orders 412A-Z (e.g., hereinafter referred to as individual order 412). Each individual order 412 may indicate whether the individual order 412 is available or not available (e.g., sold out). Each individual order 412 may provide details about a physical product, such as a graphical representation (e.g., photo), an identifier, a cost, an amount available, when available, a description, a rating, and/or the like. GUI 400A may be displayed responsive to block 202 of FIG. 2A and may be updated responsive to block 206 of FIG. 2A.

Referring to FIG. 4B, GUI 400B illustrates available group orders 422. GUI 400B may be accessed via an Available Group Orders GUI element 420 (e.g., text, link, button, tab, etc.). GUI 400B may display group orders 422A-Z (e.g., hereinafter referred to as group order 422). Each group order 422 may indicate whether the group order 422 is available or not available (e.g., sold out). Each group order 422 may provide details about a physical product, such as a graphical representation (e.g., photo), an identifier, a cost, an amount available, when available, a description, a rating, and/or the like. Each group order 422 may indicate what subset of the group order is not available (e.g., has been sold, has been ordered) and what subset of the group order is available. For example, the group order 422 may indicate one subset of the group order 422 is unavailable and one subset of the group order 422 is available. In some embodiments, physical products are available as an individual order 412 and as a group order 422. Once the individual order 412 is unavailable (e.g., sold, ordered), the corresponding group order 422 may also become unavailable (e.g., the platform integration system 110 or the order system 120 causes the GUI 400 to display an individual order 412 and a group order 422 as available for the same physical product and causes the GUI 400 to mark the individual order 412 and the group order 422 as unavailable responsive to the physical product being ordered). GUI 400B may be displayed responsive to block 202 of FIG. 2A and may be updated responsive to block 206 of FIG. 2A.

Referring to FIG. 4C, GUI 400C illustrates claim orders 432. GUI 400C may be accessed via a Claim Orders GUI element 430 (e.g., text, link, button, tab, etc.). GUI 400C may display claim orders 432A-Z (e.g., hereinafter referred to as claim order 432). Each claim order 432 may indicate whether the claim order 432 is available or not available (e.g., already purchased). Each claim order 432 may provide details about the one or more physical products associated with the claim order 432, such as a graphical representation (e.g., photo), an identifier, a cost, a description, a descriptor of the corresponding claim process, when (e.g., during which livestream video, at what day or time) the claim process occurred, the user account corresponding to the claim order 432, and/or the like. Each claim order 432 may only be accessible by the user account that corresponds to the claim order 432. In some embodiments, additional physical products can be added to a claim order 432. In some embodiments, one or more claim orders 432, group orders 422, and/or individual orders 412 may be combined in the checkout process to purchase the corresponding physical products. GUI 400C may be displayed responsive to block 260 of FIG. 2B.

Referring to FIG. 4D, GUI 400D illustrates an order queue 442. GUI 400D may be accessed via an Order Queue GUI element 440 (e.g., text, link, button, tab, etc.). GUI 400D may display an order queue 442 that includes descriptors of one or more order requests, physical product, user (e.g., user device, user account, etc.), and/or the like. Each order queue 442 may correspond to an upcoming livestream video. The order queue 442 may be populated once an order request (e.g., available individual order 412, available group order 422) has been received by the platform integration system 110 from the order system 120. The order queue 442 may be a table, chart, spreadsheet, rows and columns, text, and/or the like.

Referring to FIG. 4E, GUI 400E illustrates list 452 of timestamps and links. GUI 400E may be accessed via a List of Timestamps and Links GUI element 450 (e.g., text, link, button, tab, etc.). GUI 400E may display a list 452 that includes timestamps corresponding to display of a physical product, descriptors of physical products (e.g., identifier, etc.), links to the timestamp in the livestream video corresponding to the point in time of the display of the physical product, and/or the like. The list 452 may be populated responsive to platform integration system 110 receiving user selection of an order request (e.g., block 216 of FIG. 2A). The list 452 may be displayed via GUI 400E responsive to platform integration system 110 providing a list of timestamps and corresponding links to the order system 120.

FIG. 5 illustrates a GUI 500 used with a platforms integration system, according to certain embodiments. In some embodiments, GUI 500 is displayed by livestream system 130 (e.g., block 218 of FIG. 2A) responsive to platform integrations system 110 providing a livestream video and list of order requests to the livestream system 130 (e.g., block 214 of FIG. 2A). In some embodiments, GUI 500 is updated by livestream system 130 (e.g., block 224 of FIG. 2A) responsive to platform integrations system 110 providing an indication that physical product associated with order request is being shown via the livestream video (e.g., block 222 of FIG. 2A).

GUI 500 may display a livestream video 502. The livestream video 502 may be captured via an imaging device (e.g., video camera, smartphone, etc.) and transmitted by the platform integration system 110 to the livestream system 130. The operator (e.g., user, administrator, etc.) of the imaging device and of the platform integration system 110 may be the same. The livestream video 502 may display physical products 504. In some embodiments, the user that is operating the imaging device and the platform integration system 110 is displaying (e.g., unveiling, unwrapping, etc.) the physical products 504 via the livestream video 502. In some embodiments, the physical products 504 include a set (e.g., deck, pack) of cards that is wrapped (e.g., in a box, in cellophane wrapping, shrink wrap, silver foil wrapping, foil wrapping, etc.) and the user opens (e.g., tears, unwraps, breaks) the wrapping and displays each of the cards one by one from the set of cards. In some embodiments, a current physical product 504A that is being opened (e.g., unwrapped and displayed one by one) is displayed (e.g., in the foreground of the livestream video 502) and one or more physical products 504B-E that are to be opened are displayed (e.g., in the background of the livestream video 502).

In some embodiments, the GUI 500 displays a list of order requests 510. The list of order requests 510 may include individual orders 412 and group orders 422. The list of order requests 510 may indicate a descriptor of the order request, the physical product, the user account (e.g., user device, user), and/or the like. The order requests in the list of order requests 510 may be displayed in the sequential order that the physical products 504 are to be displayed (e.g., unwrapped, unveiled). The list of order requests 510 may be updated to indicate that a physical product corresponding to an order request has been unwrapped, is currently being unwrapped, is the next to be unwrapped, etc. In some embodiments, an order request is removed from the list of order requests 510 after the corresponding physical product has been unwrapped.

In some embodiments, the GUI 500 displays an indication of a current order request 520. The current order request may correspond to the current physical product 504A (e.g., that is being unwrapped). The indication of the current order request 520 may be displayed proximate the livestream video 502, overlaid on the livestream video 502, in the list of order requests 510, etc. The indication of the current order request 520 may be displayed responsive to block 222 of FIG. 2A.

In some embodiments, the GUI 500 displays a text conversation 530. The text conversation may be displayed proximate the livestream video 502, overlaid on the livestream video 502, etc. The text conversation 530 may be hosted by the livestream system 130. The text conversation may display text from user devices 140 and from platform integration system 110. The text conversation 530 may indicate that a claim process has started (e.g., block 244 of FIG. 2B), display claim requests (e.g., block 248 of FIG. 2B), and indicate that a claim process has ended.

Figure 6:
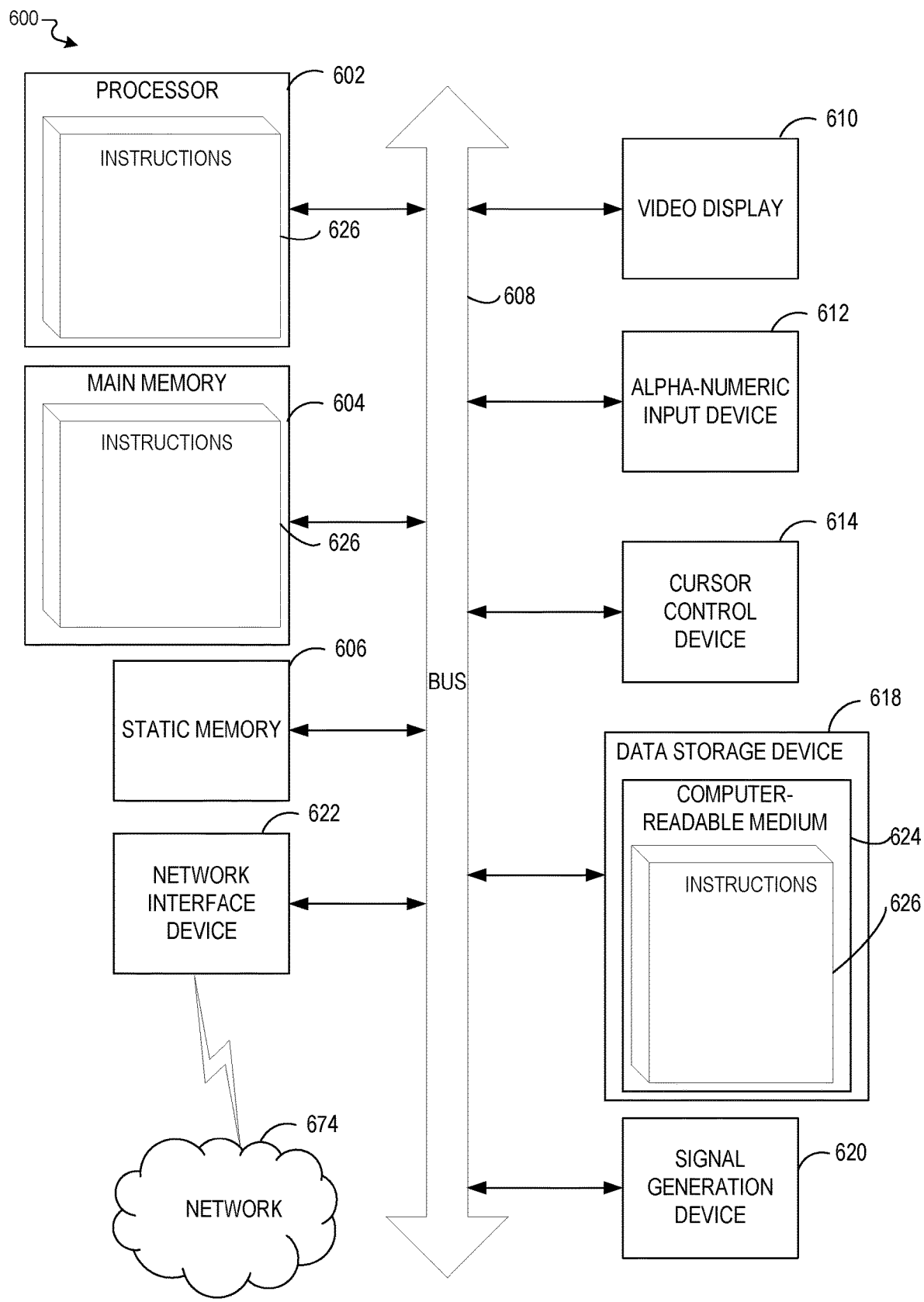
FIG. 6 is a block diagram illustrating a computer system, according to certain embodiments.

FIG. 6 is a block diagram illustrating a computer system 600, according to certain embodiments. In some embodiments, the computer system 600 is one or more of platform integration system 110, order server machine 122, livestream server machine 132, and/or user device 140.

In some embodiments, computer system 600 is connected (e.g., via a network, such as a Local Area Network (LAN), an intranet, an extranet, or the Internet) to other computer systems. In some embodiments, computer system 600 operates in the capacity of a server or a client computer in a client-server environment, or as a peer computer in a peer-to-peer or distributed network environment. In some embodiments, computer system 600 is provided by a personal computer (PC), a tablet PC, a Set-Top Box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the sequences (e.g., one or more of sequence diagrams 200A-B of FIGS. 2A-B, etc.) and/or methods described herein (e.g., one or more of methods 300A-B of FIGS. 3A-B, etc.).

In a further aspect, the computer system 600 includes a processing device 602, a volatile memory 604 (e.g., Random Access Memory (RAM)), a non-volatile memory 606 (e.g., Read-Only Memory (ROM) or Electrically-Erasable Programmable ROM (EEPROM)), and a data storage device 616, which communicate with each other via a bus 608.

In some embodiments, processing device 602 is provided by one or more processors such as a general purpose processor (such as, for example, a Complex Instruction Set Computing (CISC) microprocessor, a Reduced Instruction Set Computing (RISC) microprocessor, a Very Long Instruction Word (VLIW) microprocessor, a microprocessor implementing other types of instruction sets, or a microprocessor implementing a combination of types of instruction sets) or a specialized processor (such as, for example, an Application Specific Integrated Circuit (ASIC), a Field Programmable Gate Array (FPGA), a Digital Signal Processor (DSP), or a network processor).

In some embodiments, computer system 600 further includes a network interface device 622 (e.g., coupled to network 674). In some embodiments, computer system 600 also includes a video display unit 610 (e.g., an LCD), an alphanumeric input device 612 (e.g., a keyboard), a cursor control device 614 (e.g., a mouse), and a signal generation device 620.

In some implementations, data storage device 616 includes a non-transitory computer-readable storage medium 624 on which store instructions 626 encoding any one or more of the methods or functions described herein, including instructions for implementing methods described herein.

In some embodiments, instructions 626 also reside, completely or partially, within volatile memory 604 and/or within processing device 602 during execution thereof by computer system 600, hence, in some embodiments, volatile memory 604 and processing device 602 also constitute machine-readable storage media.

While computer-readable storage medium 624 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

In some embodiments, the methods, components, and features described herein are implemented by discrete hardware components or are integrated in the functionality of other hardware components such as ASICS, FPGAs, DSPs or similar devices. In some embodiments, the methods, components, and features are implemented by firmware modules or functional circuitry within hardware devices. In some embodiments, the methods, components, and features are implemented in any combination of hardware devices and computer program components, or in computer programs.

Unless specifically stated otherwise, terms such as "receiving," "adding," "causing," "generating," "sending," "transmitting," "determining," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. In some embodiments, the terms "first," "second," "third," "fourth," etc. as used herein are meant as labels to distinguish among different elements and do not have an ordinal meaning according to their numerical designation.

Examples described herein also relate to an apparatus for performing the methods described herein. In some embodiments, this apparatus is specially constructed for performing the methods described herein, or includes a general purpose computer system selectively programmed by a computer program stored in the computer system. Such a computer program is stored in a computer-readable tangible storage medium.

Some of the methods and illustrative examples described herein are not inherently related to any particular computer or other apparatus. In some embodiments, various general purpose systems are used in accordance with the teachings described herein. In some embodiments, a more specialized apparatus is constructed to perform methods described herein and/or each of their individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

The preceding description sets forth numerous specific details such as examples of specific systems, components, methods, and so forth in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular implementations may vary from these exemplary details and still be contemplated to be within the scope of the present disclosure.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion.

Reference throughout this specification to "one embodiment," "an embodiment," or "some embodiments" means that a particular feature, structure, or characteristic described in connection with the embodiment is included in at least one embodiment. Thus, the appearances of the phrase "in one embodiment," "in an embodiment," or "in some embodiments" in various places throughout this specification are not necessarily all referring to the same embodiment. In addition, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Also, the terms "first," "second," "third," "fourth," etc. as used herein are meant as labels to distinguish among different elements and can not necessarily have an ordinal meaning according to their numerical designation.

Although the operations of the methods herein are shown and described in a particular order, the order of operations of each method may be altered so that certain operations may be performed in an inverse order so that certain operations may be performed, at least in part, concurrently with other operations. In another embodiment, instructions or sub-operations of distinct operations may be in an intermittent and/or alternating manner.

It is understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
   receiving an order request associated with a user and a first physical product;
   adding the order request to a list of order requests;
   causing a first graphical user interface (GUI) to display a livestream video and the list of order requests; and
   responsive to receiving user selection of the order request from the list of order requests:
     generating a timestamp associated with the user selection; and
     causing the first GUI to be updated to indicate the first physical product associated with the order request is being shown via the livestream, wherein the first physical product is a set of cards that are wrapped, and wherein the causing of the first GUI to be updated to indicate the first physical product is being shown via the livestream is associated with unwrapping and display of the set of cards via the livestream.

2. The method of claim 1, wherein responsive to the receiving of the user selection of the order request, the method further comprises sending, to a user device associated with the user, a notification comprising a link to a point in the livestream corresponding to the timestamp.

3. The method of claim 2, wherein responsive to the receiving of the user selection of the order request, the method further comprises adding the link to a list of timestamps associated with fulfilled order requests.

4. The method of claim 3, wherein responsive to the receiving of the user selection of the order request, the method further comprises causing a second GUI to display the list of timestamps and corresponding links.

5. The method of claim 1, wherein the receiving of the order request is by a platform integration server from an order server, and wherein the order server receives the order request from a user device.

6. The method of claim 1 further comprising:
   receiving user input associated with starting a claim process for a second physical product;
   causing the first GUI to be updated to indicate that the claim process has started;
   receiving one or more claim requests for the second physical product, the one or more claim requests being associated with one or more user devices;
   receiving user input associated with ending the claim process;
   generating, based on the one or more claim requests, one or more order requests associated with the second physical product; and
   causing a third GUI to be updated with the one or more order requests.

7. The method of claim 6, wherein the causing of the first GUI to be updated to indicate the claim process has started is by transmitting first text indicative that the claim process has started to a text conversation, and wherein the receiving of the one or more claim requests is via one or more second text entered via the text conversation.

8. A non-transitory machine-readable storage medium storing instructions which, when executed cause a processing device to perform operations comprising:
- receiving an order request associated with a user and a first physical product;
- adding the order request to a list of order requests;
- causing a first graphical user interface (GUI) to display a livestream video and the list of order requests; and
- responsive to receiving user selection of the order request from the list of order requests:
  - generating a timestamp associated with the user selection; and
  - causing the first GUI to be updated to indicate the first physical product associated with the order request is being shown via the livestream, wherein the first physical product is a set of cards that are wrapped, and wherein the causing of the first GUI to be updated to indicate the first physical product is being shown via the livestream is associated with unwrapping and display of the set of cards via the livestream.

9. The non-transitory machine-readable storage medium of claim 8, wherein responsive to the receiving of the user selection of the order request, the operations further comprise sending, to a user device associated with the user, a notification comprising a link to a point in the livestream corresponding to the timestamp.

10. The non-transitory machine-readable storage medium of claim 9, wherein responsive to the receiving of the user selection of the order request, the operations further comprise adding the link to a list of timestamps associated with fulfilled order requests.

11. The non-transitory machine-readable storage medium of claim 10, wherein responsive to the receiving of the user selection of the order request, the operations further comprise causing a second GUI to display the list of timestamps and corresponding links.

12. The non-transitory machine-readable storage medium of claim 8, wherein the receiving of the order request is by a platform integration server from an order server, and wherein the order server receives the order request from a user device.

13. The non-transitory machine-readable storage medium of claim 8, wherein the operations further comprise:
- receiving user input associated with starting a claim process for a second physical product;
- causing the first GUI to be updated to indicate that the claim process has started;
- receiving one or more claim requests for the second physical product, the one or more claim requests being associated with one or more user devices;
- receiving user input associated with ending the claim process;
- generating, based on the one or more claim requests, one or more order requests associated with the second physical product; and
- causing a third GUI to be updated with the one or more order requests.

14. The non-transitory machine-readable storage medium of claim 13, wherein the causing of the first GUI to be updated to indicate the claim process has started is by transmitting first text indicative that the claim process has started to a text conversation, and wherein the receiving of the one or more claim requests is via one or more second text entered via the text conversation.

15. A system comprising:
- memory; and
- a processing device coupled to the memory, wherein the processing device is to:
  - receive an order request associated with a user and a first physical product;
  - add the order request to a list of order requests;
  - cause a first graphical user interface (GUI) to display a livestream video and the list of order requests; and
  - responsive to receiving user selection of the order request from the list of order requests:
    - generate a timestamp associated with the user selection; and
    - cause the first GUI to be updated to indicate the first physical product associated with the order request is being shown via the livestream, wherein the first physical product is a set of cards that are wrapped, and wherein causing the first GUI to be updated to indicate the first physical product is being shown via the livestream is associated with unwrapping and display of the set of cards via the livestream.

16. The system of claim 15, wherein responsive to the receiving of the user selection of the order request, the processing device is further to:
- send, to a user device associated with the user, a notification comprising a link to a point in the livestream corresponding to the timestamp;
- add the link to a list of timestamps associated with fulfilled order requests; and
- cause a second GUI to display the list of timestamps and corresponding links.

17. The system of claim 15, wherein the processing device is further to:
- receive user input associated with starting a claim process for a second physical product;
- cause the first GUI to be updated to indicate that the claim process has started;
- receive one or more claim requests for the second physical product, the one or more claim requests being associated with one or more user devices;
- receive user input associated with ending the claim process;
- generate, based on the one or more claim requests, one or more order requests associated with the second physical product; and
- cause a third GUI to be updated with the one or more order requests.

18. The system of claim 17, wherein to cause the first GUI to be updated to indicate the claim process has started, the processing device is to transmit first text indicative that the claim process has started to a text conversation, and wherein the processing device is to receive the one or more claim requests via one or more second text entered via the text conversation.

* * * * *